(12) United States Patent
White et al.

(10) Patent No.: US 10,019,775 B2
(45) Date of Patent: Jul. 10, 2018

(54) METHOD AND SYSTEM FOR SCALABLE, RADIATION-TOLERANT, SPACE-RATED, HIGH INTEGRITY GRAPHICS PROCESSING UNIT

(71) Applicant: HONEYWELL INTERNATIONAL INC., Morristown, NJ (US)

(72) Inventors: Daryl A. White, Peoria, AZ (US); Ted Bonk, Cave Creek, AZ (US); Tu D. Dang, Glendale, AZ (US); John Allan Morgan, Peoria, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 211 days.

(21) Appl. No.: 14/830,951

(22) Filed: Aug. 20, 2015

(65) Prior Publication Data

US 2016/0321775 A1 Nov. 3, 2016

Related U.S. Application Data

(60) Provisional application No. 62/154,904, filed on Apr. 30, 2015.

(51) Int. Cl.
*G06T 1/20* (2006.01)
*G06F 9/38* (2018.01)

(52) U.S. Cl.
CPC .............. *G06T 1/20* (2013.01); *G06F 9/3885* (2013.01)

(58) Field of Classification Search
CPC .............. G06F 11/0751; G06F 13/385; G06F 9/30087; G06F 11/1004; G06F 11/1608; G06F 11/1658; G06F 11/183; G06F 11/20; G06F 2201/85; G06F 3/1415; G06F 3/1438; G06F 3/1446; G06F 9/3885; G06T 1/20; G06T 15/005; G06T 2210/52; G09G 2360/06; G09G 2360/08; G09G 2370/20; G09G 5/14; H03K 19/0033; H03K 19/23; H04N 21/2368; H04N 21/4307

See application file for complete search history.

(56) References Cited

U.S. PATENT DOCUMENTS 6,646,645 B2  11/2003  Simmonds et al.
6,885,376 B2   4/2005  Tang-Petersen et al.
7,620,883 B1 * 11/2009  Carmichael ......... G06F 11/1004
                                                                714/725

(Continued)

OTHER PUBLICATIONS

Sheaffer, Jeremy W., David P. Luebke, and Kevin Skadron. "A hardware redundancy and recovery mechanism for reliable scientific computation on graphics processors." Graphics Hardware. vol. 2007. 2007.*

(Continued)

*Primary Examiner* — Zhengxi Liu
*Assistant Examiner* — Scott E Sonners
(74) *Attorney, Agent, or Firm* — Lorenz & Kopf, LLP (57) ABSTRACT

The provided scalable, radiation tolerant, high-integrity, space-rated Graphical Processing Unit (GPU) supports open interfaces and provides sufficient graphics performance for known display formats as well as as-yet-undefined, futuristic, display formats that may be updated on-mission without needing, for example, a host space vehicle to return to earth or a lunar site. The provided GPU further provides flexibility and dynamic scalability.

11 Claims, 5 Drawing Sheets

(56) References Cited

U.S. PATENT DOCUMENTS

| | | | |
|---|---|---|---|
| 7,870,299 B1 * | 1/2011 | Sorensen | G06F 11/1004 |
| | | | 710/2 |
| 7,876,257 B2 | 1/2011 | Vetro et al. | |
| 8,446,418 B2 | 5/2013 | Kegasawa | |
| 8,660,193 B2 | 2/2014 | Rubinstein et al. | |
| 8,773,446 B2 | 7/2014 | Gnanasambandam et al. | |
| 8,976,264 B2 | 3/2015 | Rivard et al. | |
| 2007/0188610 A1 | 8/2007 | Micotto et al. | |
| 2008/0158235 A1 | 7/2008 | Bakalash et al. | |
| 2008/0316216 A1 | 12/2008 | Bakalash et al. | |
| 2013/0185604 A1 * | 7/2013 | Hickey | G06F 11/1641 |
| | | | 714/49 |
| 2015/0109310 A1 | 4/2015 | Ayanam et al. | |

OTHER PUBLICATIONS

Jeon, Hyeran, and Murali Annavaram. "Warped-dmr: Light-weight error detection for gpgpu." Proceedings of the 2012 45th Annual IEEE/ACM International Symposium on Microarchitecture. IEEE Computer Society, 2012.*

* cited by examiner

METHOD AND SYSTEM FOR SCALABLE, RADIATION-TOLERANT, SPACE-RATED, HIGH INTEGRITY GRAPHICS PROCESSING UNIT

CROSS-REFERENCE TO RELATED APPLICATION

This application claims the benefit of priority to U.S. Provisional Application Ser. No. 62/154,904 filed on Apr. 30, 2015, the contents of which are herein incorporated by reference in their entirety.

TECHNICAL FIELD

Embodiments of the subject matter described herein relate generally to graphics processing units and, more particularly, to design and implementation of a scalable, radiation-tolerant, space-rated, high integrity Graphics Processing Unit (GPU).

BACKGROUND

Human space Liquid Crystal Display (LCD) units and Graphics Processing Units (GPUs) are a niche market. There are only a few space vehicles that utilize them, and they are updated too infrequently for the commercial industry to invest in development of human space LCD units and GPUs. In addition to the infrequency of updating, GPUs for use in space traditionally require hardware redesign each time a major display format change.

Typically, GPUs for use in space are required to meet a variety of often competing requirements, such as dynamic scalability, radiation tolerance, support for open interfaces, flexibility, graphics performance, and high integrity. In order to meet these requirements, GPUs for use in space are traditionally built using Application Specific Integrated Circuits (ASICs). However, traditional solutions to building GPUs often have power consumption issues or processing speed limitations, and are difficult to update. While Field Programmable Gate Arrays (FPGAs) are typically more cost effective than ASICS and Commercial Off The Shelf (COTS) CPUs, space-rated (radiation tolerant) FPGAs have typically not met performance requirements for GPUs in space.

Accordingly, a dynamically scalable, radiation tolerant, high-integrity, space-rated GPU is desired. The desired GPU supports open interfaces and provides sufficient graphics performance for known display formats as well as as-yet-undefined, futuristic, display formats that may be updated on-mission without requiring a hardware update. The desired GPU further provides flexibility and dynamic scalability for yet to be defined missions. The present invention provides the desired features.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method for implementing a GPU is provided, comprising: at a first GPU core: receiving N input Parallel Graphic Data sets (PGD), where N is a first number; dynamically creating a first configuration in which each of the N input PGD is coupled to a respective one of N graphics engines; dynamically (i) enabling P graphics engines, where P is a second number that is less than or equal to N, and (ii) disabling a remaining N−P graphics engines; at each of the P enabled graphics engines, processing PGD by (i) validating an associated input PGD, thereby generating a validated PGD; (ii) rasterizing the validated PGD, thereby creating a rasterized PGD, and (iii) synchronizing the rasterized PGD according to the first configuration, thereby creating a synch-adjusted PGD; merging the synch-adjusted PGD from each of the P graphics engines, thereby creating merged PGD; and distributing, according to a first distribution, the merged PGD to a plurality of graphic sinks.

Also provided is a GPU, comprising: a first core, comprising: a source configuration module coupled to a source of input PGD and configured to control the input PGD; N graphic engines, where N is a number, the N graphic engines coupled to the source configuration module and each graphic engine configured to receive an associated input PGD and generate rasterized PGD therefrom; N synch-adjust modules, a respective one of the N coupled to each of the N graphic engines, each synch-adjust module configured to time synchronize a respective rasterized PGD, thereby generating synch-adjusted PGD; a merge module coupled to each of the N synch-adjust modules and configured to (i) receive synch-adjusted PGD from each of the N graphic engines, and (ii) merge the synch-adjusted PGD, generating merged PGD from the first core; and a distribution module coupled to the merge module and configured to distribute the merged PGD to a plurality of graphic sinks.

Another method for implementing a GPU is provided. The method comprises: at a first GPU core: receiving N input parallel graphic data sets (PGD), where N is a first number; dynamically creating a first configuration in which each of the N input PGD is associated with a respective one of N graphics engines; dynamically (i) enabling P graphics engines, where P is a second number that is less than or equal to N, and (ii) disabling a remaining N−P graphics engines; at each of the P enabled graphics engines, processing data by (i) generating a validated PGD; (ii) rasterizing the validated PGD, thereby creating a rasterized PGD, and (iii) synchronizing the rasterized PGD according to the first configuration, thereby creating a synch-adjusted PGD; merging each of the synch-adjusted PGD associated with each of the P graphics engines, thereby creating merged PGD; and distributing the merged PGD to a plurality of graphic sinks.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

In the interest of brevity, conventional techniques related to known graphics and image processing, sensors, and other functional aspects of certain systems and subsystems (and the individual operating components thereof) are not described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Mechanisms to control features may utilize processors, logic and/or memory. Such operations, tasks, and functions are sometimes referred to as being processor-executed, computer-executed, computerized, software-implemented, or computer-implemented. In practice, one or more devices can carry out the described operations, tasks, and functions by manipulating electrical signals representing data bits at memory locations in the processor electronics of the display system, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions for a space application. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, and consistent with the discussion hereinabove, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein presents a novel method and system that may be implemented in a single or multiple radiation tolerant FPGAs. As used herein, "space-rated" means a device/component that employs/includes subcomponents or practices to overcome environmental impacts and hazards introduced by radiation, vibration loads, acoustic loads, vacuum and/or temperature. The method and system described herein provides a novel space-rated configurable GPU that is capable of operating independently (i.e., does not require direction from an external Central Processing Unit (CPU), and is not part of a master-slave methodology) and has open interfaces. The presented system and method advantageously provide dynamic scalability, flexibility, graphics performance with high integrity information display. This novel method and system, increase performance by dividing appropriately sized functions into modules and parts that may be optimized and efficiently time-synchronized. Parallel paths and data comparison stages are included to ensure that invalid or missing data due to radiation and other reasons is detected. Configuration data provides behavior response to invalid/missing data or loss of time-synchronization.

As used herein, "safety critical" is defined as any computer, electronic or electromechanical system whose failure may cause injury or death to human beings, and "redundant" is defined as a component or subcomponent providing exact or equivalent functionality that complies with the same requirements as another component or subcomponent. In addition to being described in terms of parallel paths and data stages, the embodiment described herein may be referred to as having "safety critical redundant mirrored members," meaning that a GPU designed according to this embodiment, configured and enabled to receive the same data from a same graphic source (such as graphics source 108 in the below discussion) as another GPU (of the M total GPU cores introduced below) does process and validate that graphic source data, using the exact (redundant) functionality, thereby ensuring that the provided embodiment is suitable and qualified to be used in a safety critical environment.

As used herein, "radiation mitigation" is defined as the capability to detect, and deterministically respond to, non-destructive radiation dosing. In the past, mitigation of radiation dosing was handled by using redundant equipment. The embodiment described herein presents a novel built-in radiation mitigation technique by 1) creating parallel data paths to interject the capability to detect data corruption (see, for example, FIG. 2 and FIG. 3 modules 106, 201, 203, and 205), 2) detecting data corruption (see, for example, modules 402, 404, 406) and 3) embedding feedback paths and control (see, for example, modules 106, 206, 112, 302, 124, and 126) deterministically responding to detected data corruption.

Implementation of the above introduced features is described in detail below. The described embodiment is merely an example and serves as guide for implementing the novel methods and structure in the creation of a GPU for any application required to adhere to similar standards. As such, the examples presented herein are intended as non-limiting.

Figure 1:
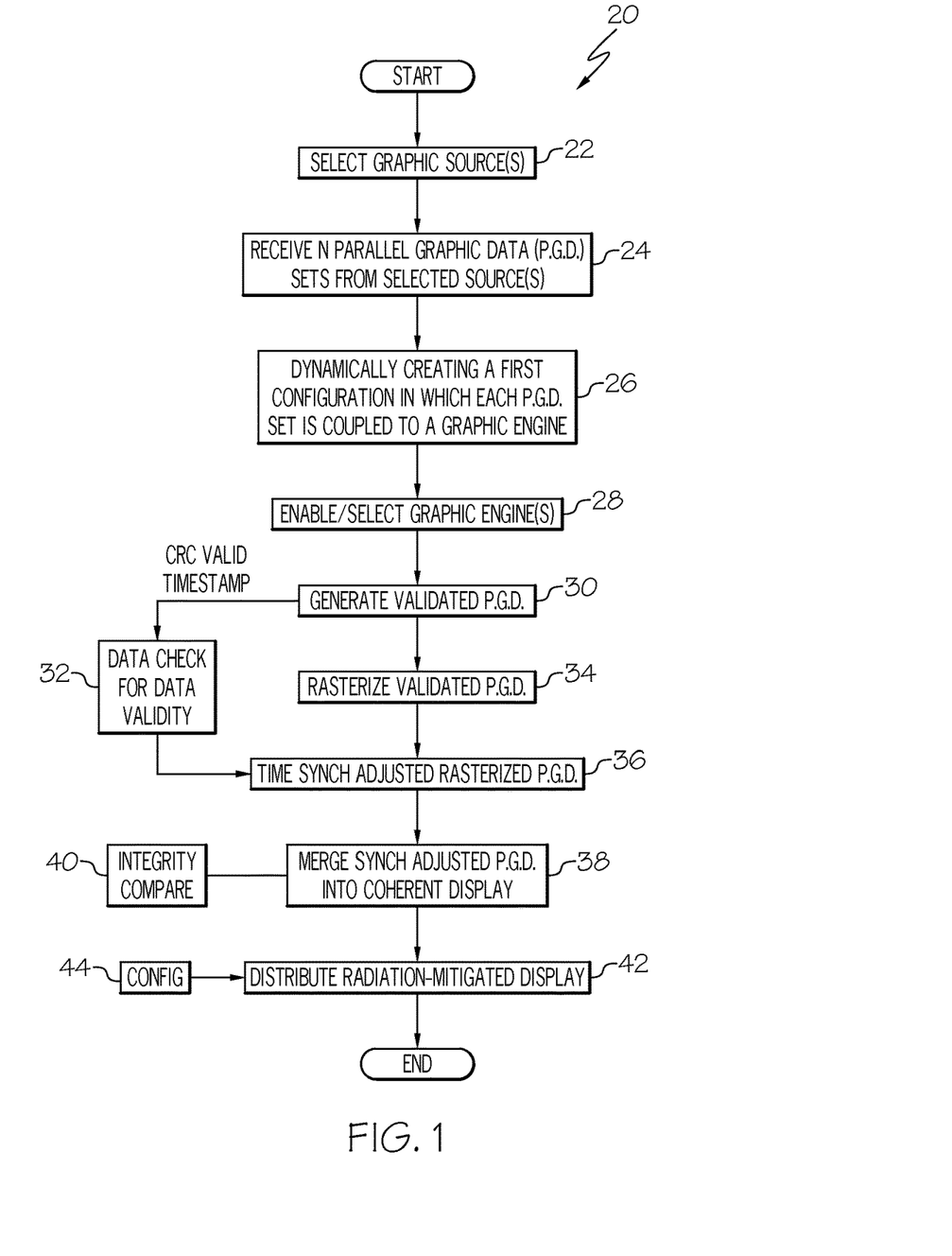
FIG. 1 is a flow chart illustrating the flow of parallel graphic data through a GPU, according to an exemplary embodiment.

FIG. 1 is a flow chart illustrating the flow of parallel graphic data through a GPU, according to an exemplary embodiment. As stated, the GPU may comprise M total GPU cores, and each of the GPU cores may comprise the same process steps. Additionally, the below described steps may be reorganized, and additional steps may be added without straying from the scope of the invention.

Once the process 20 is started, graphic source(s) for the GPU (GPU 100, FIG. 2) are selected. Source selection (STEP 22) is achieved via source configuration module (106, FIG. 3) controlling stage one switches (201, 203, and 205, FIG. 3), to provide parallel graphic data ("PGD") to the GPU (GPU 100, FIG. 2). The GPU flexibly accepts PGD from a variety of graphics sources that operate with any industry standard open interface format, such as, Open Graphics Library (OpenGL), digitized video (h.264), ARINC 818, Low Voltage Differential Signaling (LVDS), or the like.

Once the source(s) are selected, the GPU (GPU 100, FIG. 2) receives up to N parallel graphic data sets (PGD) from selected sources (STEP 24). At STEP 26, process 20 dynamically creates a first configuration in which each of the N input parallel graphical data sets is coupled (via module 206 and stage two switches (208, 210, 212, FIG. 3) to a respective one of N graphics engines. STEP 26 advantageously provides the ability to dynamically create and/or reduce redundancy, for example, by directing PGD from a single source to multiple graphic engines when needed.

Figure 3:
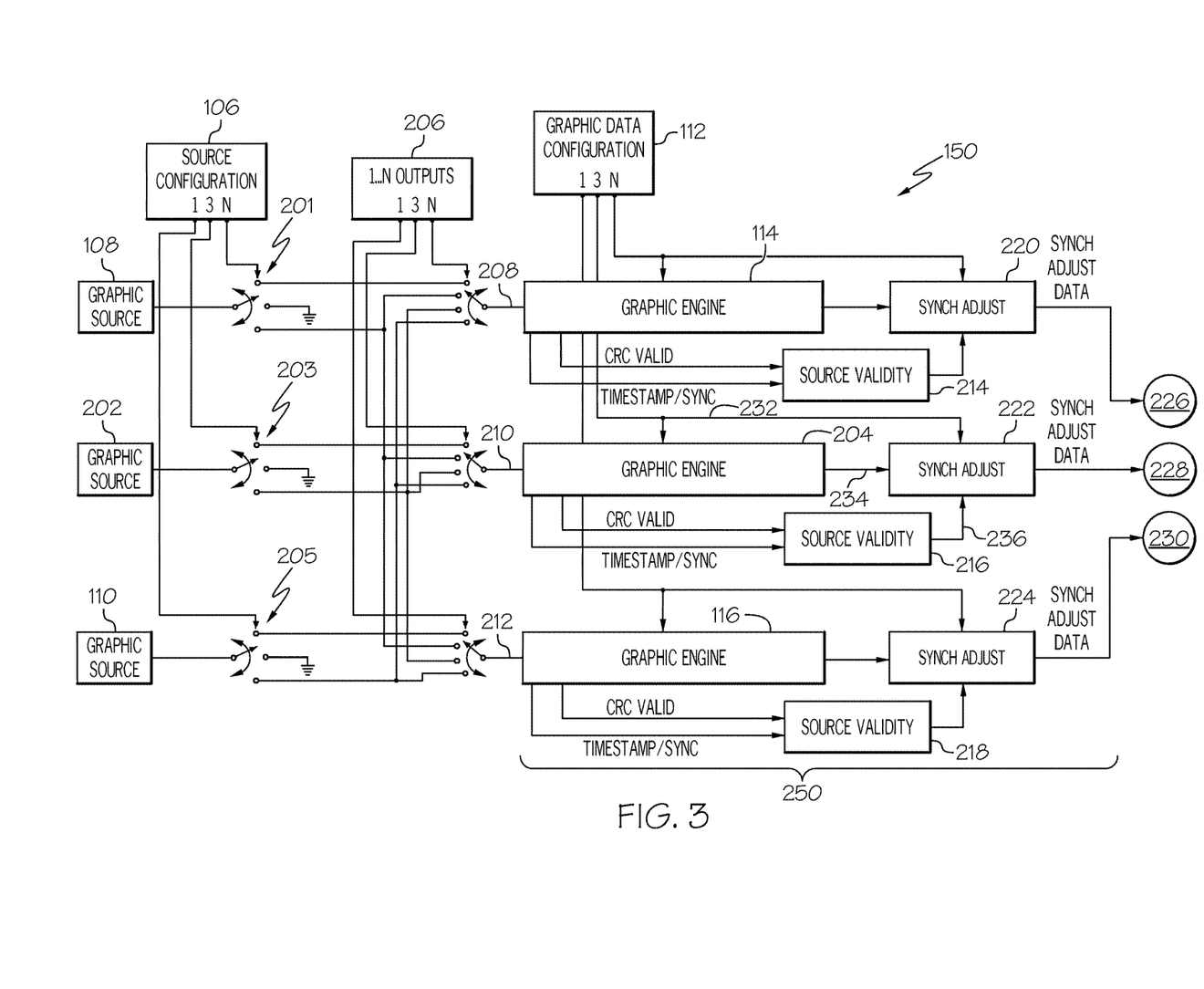
FIG. 3 is an expanded block diagram of a first portion of FIG. 1, providing additional detail, in accordance with the exemplary embodiment.

In STEP 28 each of the N total graphic engines are enabled/selected or disabled/deselected via control from graphic data configuration module (112, FIG. 3). Providing the ability to disable unneeded graphic engines allows tight control over power consumption. At STEP 30, the graphic engine generates, via a geometry engine (408, FIG. 4), validated PGD, and generates, via a graphic data CRC module (402, FIG. 4), a CRC valid and timestamp/sync signal to be used in a subsequent step for time synchronizing the PGD.

At STEP 32, a source validity module (for example, 214, 216, and 218, FIG. 4), performs a "data check". The graphics engine processes PGD. The "data check" verifies that there is no data corruption between the input PGD, prior to processing, and the PGD after it has been processed by the graphics engine. In response to a valid data check, the source validity module (for example, 214) generates an "input data validity indication" signal that is received by a subsequent step. In STEP 34, validated PGD is rasterized. Rasterized PGD is passed to a synch adjust module (for example, 220, 222, and 224, FIG. 3), wherein the rasterized PGD is time synchronized. The rasterized PGD is time synchronized based on the input data validity signal received from process STEP 32, as well as input from the graphic data configuration module (112, FIG. 3). Notably, in STEPS 22-34, neither processing nor data is time partitioned; instead, at STEP 36, if and when data is valid, it is time synchronization adjusted for the subsequent step. Time synchronization ensures that input parallel graphics data is coherent and consistently presented in the output graphics data.

At STEP 38, the synch adjusted PGD generated in STEP 36 is merged into a coherent display, based in part on received "integrity compare signals" from at least some of the remaining M cores. At STEP 40, a compare module (302, FIG. 5) performs an "integrity compare," in which it compares the merged PGD (308 FIG. 5) from a merge module in a first GPU core to merged PGD from a merge module in a second GPU core (wherein the first GPU core and second GPU core are two of M total cores). If the two PGD are equal (or match), this is referred to as a data compare, and the compare module 302 generates an enable signal (enable is "on"). If the data does not match (i.e., a "miscompare"), the compare module 302 disables, or turns the enable "off." In an exemplary embodiment, the compare module 302 receives data input from each merge module of the plurality of merge modules, found within each of the M cores to produce a respective enable signal. The enable signal enables an associated merged PGD from a first core to be merged with a different merged PGD from another core, generating a coherent display. The Graphics Data Configuration Module 112 ensures that a known graphics data system response to radiation events is provided for distribution.

At STEP 42, merged PGD flows to a distribution module which distributes a radiation-mitigated PGD display or image to beam formers which drive graphic sinks. At STEP 44, a device configuration module (124 FIG. 5) that contains data, logic, and/or memory, and receives enable signals, deterministically and real-time generates control signals to configure the N×N distribution module 126 defining a distribution for the merged PGD to subsequent graphic sinks. This feature flexibly provides support for a variety of now known and as-yet-undefined display formats.

Figure 2:
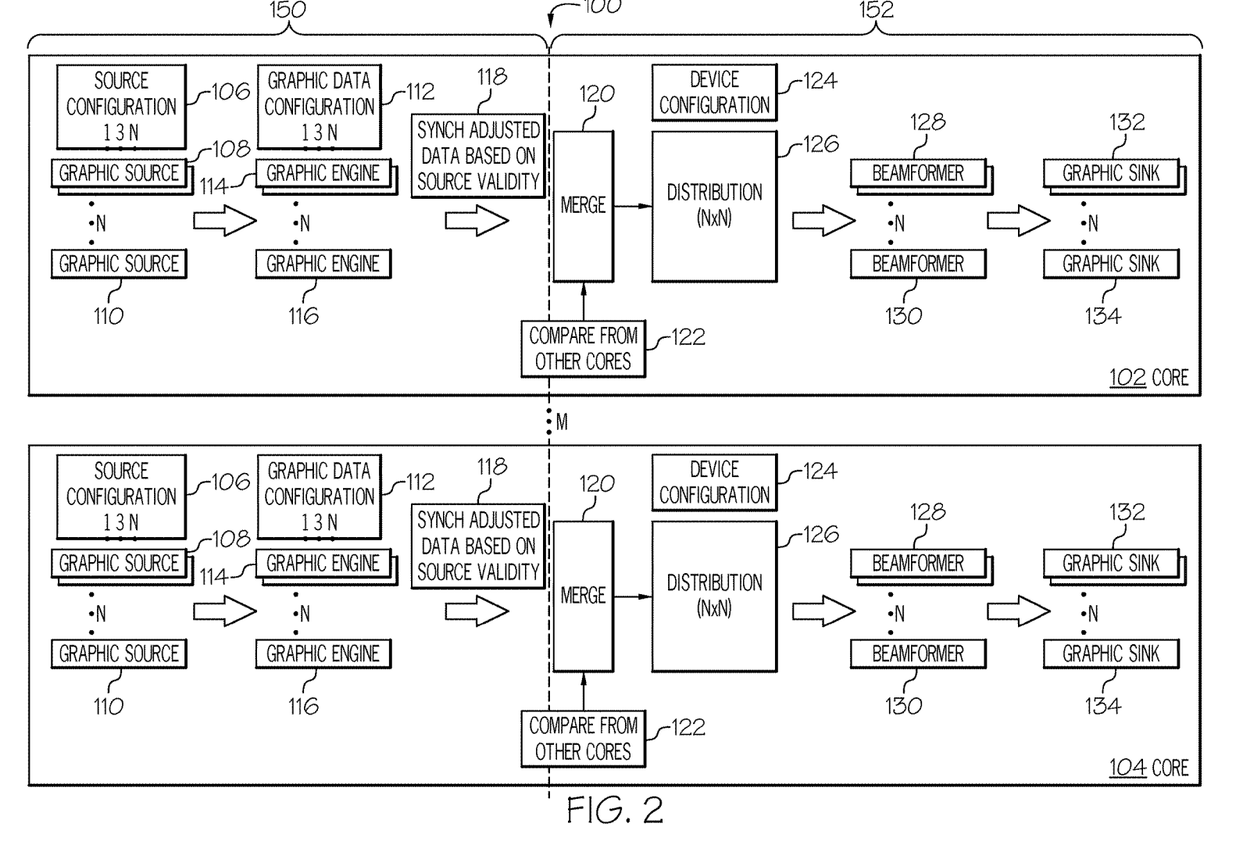
FIG. 2 is a simplified block diagram of a GPU according to an exemplary embodiment.

FIG. 2 is a simplified block diagram of a graphics processing unit GPU 100 according to an exemplary embodiment. An embodiment of GPU 100 is included in a single radiation tolerant FPGA (in this example) and comprises M identical cores: core 1 (102) through core M (104). Each of the M cores in the embodiment includes the same internal blocks or sub-modules that are introduced and described herein below.

Graphic sources provide high level PGD to the GPU 100. At the input side of the GPU, there are N graphic sources: graphic source 1 (108) to graphic source N (110). As stated, GPU 100 accepts graphic data from a variety of graphics sources that operate with any industry standard open interface format, such as, open graphics library (OpenGL), digitized video, ARINC 818, low voltage differential signaling (LVDS), or the like. Advantageously, in the embodiment, graphic source 1 (108) to graphic source N (110) are not required to be of the same open interface format. In addition, one skilled in the art will recognize that GPU 100 does not receive or require the input PGD to have associated graphics commands, nor is it under the direction of, or working in cooperation with, a remote central processing unit.

A source configuration module 106 controls which of the N graphics sources supplies the graphic data input to each of N graphics engines (graphics engine 1 (114) to graphics engine N (116)), the N graphics engines each being a type of graphic processing unit. Output from each of the N graphics engines is synch-adjusted based on source data validity (module 118). Synch adjusting is a time synchronization methodology in which data (grouped into data groupings) is processed at the proper time for use by a GPU internal block or sub-module. Synch adjusting provides more flexibility and efficiency than traditional strict time partitioning methods because, with synch adjusting, the data is only processed when, and if, needed. The functionality of the graphics engines (graphics engine 1 (114) to graphics engine N (116)) and modules 118 are described in more detail in connection with FIG. 4.

Grouped, synch-adjusted data (output from module 118) becomes input to the merge module 120, and is also coupled with compare signals from other cores (block 122). By incorporating the compare signals from other cores (block 122); the merge module 120 merges synch-adjusted data from each of the M cores into a coherent display. The functionality of the merge module 120 is described in more detail in connection with FIG. 5. Output from the merge module 120 is coupled into N×N distribution module 126, which receives control input from device configuration module 124.

Selected output from the N×N distribution module 126 is coupled to N beamformers, shown as beamformer 128 through beamformer 130. The N beamformers supply input to N graphic sinks, depicted as graphic sink 132 through graphic sink 134. A graphic sink may be any suitable graphic display device or module, such as a liquid crystal display (LCD) or Organic Light Emitting Diode (OLED) display.

As is readily apparent, FIG. 2 is a simplified block diagram intended to provide an overview of the flow of graphic data and of some of the features in each of the M cores of the radiation tolerant GPU of the exemplary embodiment. FIG. 2 is broken into a first region 150 and a second region 152. The following figures and descriptions provide more details associated with each of these regions.

FIG. 3 is an expanded block diagram of a first region 150 of FIG. 2, providing additional detail, in accordance with the exemplary embodiment. For simplifying purposes, where there are N possible objects, only the first, third, and Nth member of the N possible objects are depicted. As an overview, first region 150 may be further divided into two sub-sections: a novel method for selection of input for each of the N graphics engines, which is described herein; and subsection 250, which provides more detail for the N graphics engines and additional novel features for validity checking and time synchronizing, or synch-adjusting. Notably, in FIG. 3, module 118 from FIG. 2 is shown as further comprising a source validity module 214 and a synch adjust module 220.

A novel method for selection of the input to the N graphics engines (first region 150) is provided as follows. Source configuration module 106 includes logic and memory, such as a lookup-table, to dynamically and real-time enable/disable each graphic source of the N graphic sources providing graphic data to GPU 100. The output from source configuration module 106 controls each switch of a plurality of stage one switches (N stage one switches, 201 to 205) in order to effect the selection of a graphics source (for example, 108, 202, or 110) as input to the next stage of switches (the stage two switches, N switches, depicted as 208, 210, and 212). Next, module 206 includes logic and memory, such as a lookup-table, to dynamically and real-time control each switch of the plurality of stage two switches, which select the respective input for each of the N graphics engines (114 to 116). The selection methodology provided by the combined source configuration module 106 and module 206 dynamically supports a variety of input configurations to the N graphics engines; for example, graphics source 108 may be coupled to (or associated with) each of the N graphics engines, increasing redundancy.

The selection methodology provided by the combined source configuration module 106 and module 206 advantageously enables deterministic detection and a reconfiguration response to dynamic management/control over power and processing, a flexibility that is replicated for all of the M cores. Accordingly, the novel selection methodology provides flexibility over power consumption and performance that may support a variety of system missions. For example, pursuant to a system's mission, graphical performance may be increased, thus increasing power consumption, or graphical performance may be decreased in order to decrease power consumption.

In the embodiment, graphic data configuration module 112 comprises logic and memory and may turn on or turn off (i.e., enable or disable) each of the N graphics engines. Graphic data configuration module 112 is another dynamically configurable feature. For example, pursuant to a system's mission, any of the N graphics engines could be turned off (i.e., disabled), to save power. It is contemplated that, in an embodiment, there may be P graphics engines enabled or "on," where P is a number less than N, and the remaining N−P graphics engines are disabled, or "off." Ensuring that each of the N graphics engines either on or off at all times averts unnecessary power draw.

In another embodiment employing redundancy, if a single graphics source, such as graphics source 108, is the input to each of N graphics engines, the resulting parallel paths and data comparisons may ensure that invalid data or missing data is detected. In this configuration of GPU 100, the validity checking and substantially parallel processing may be desirable for some system missions and applications.

Figure 4:
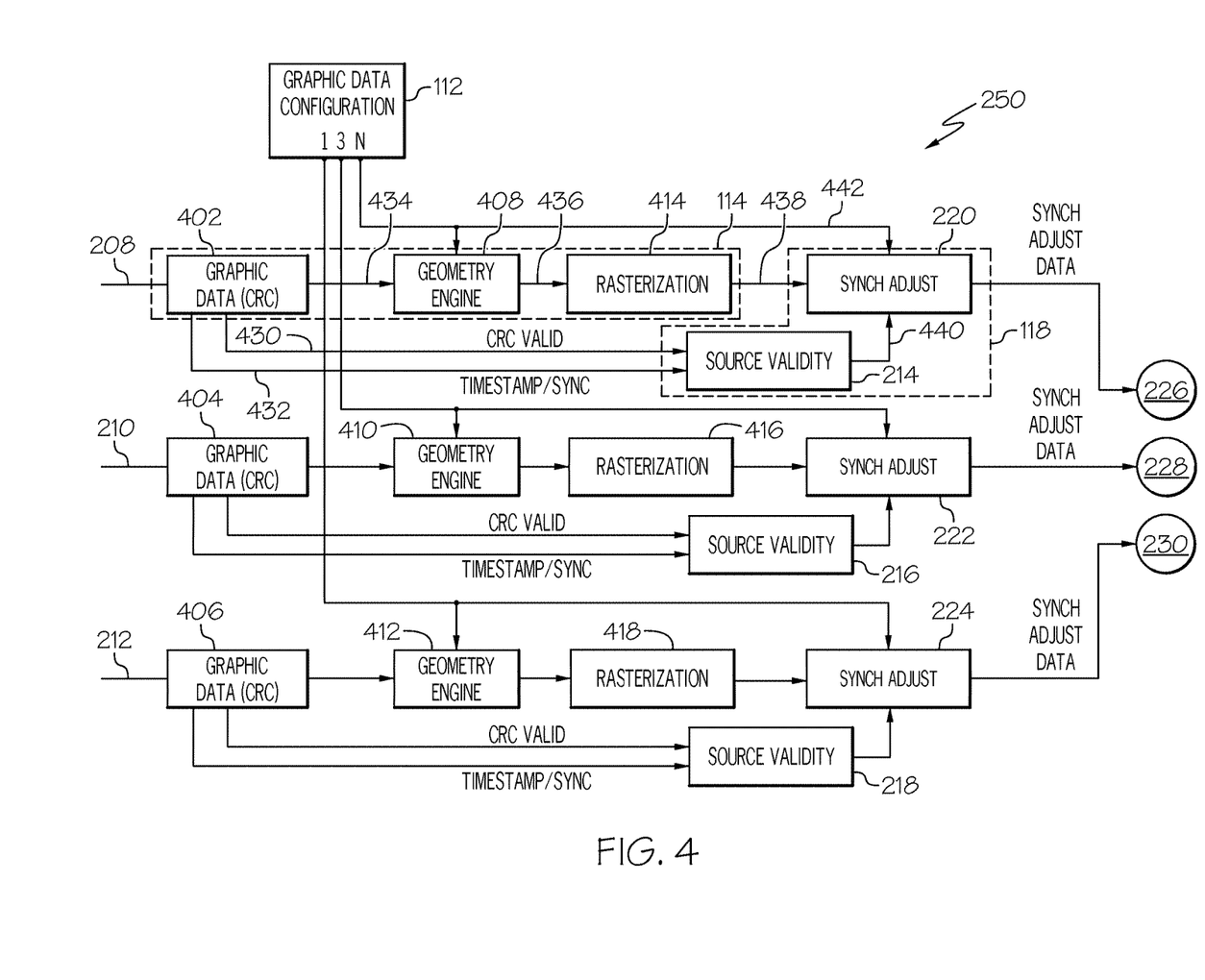
FIG. 4 is a further expanded block diagram of FIG. 1, providing more detail, in accordance with the exemplary embodiment.
Figure 5:
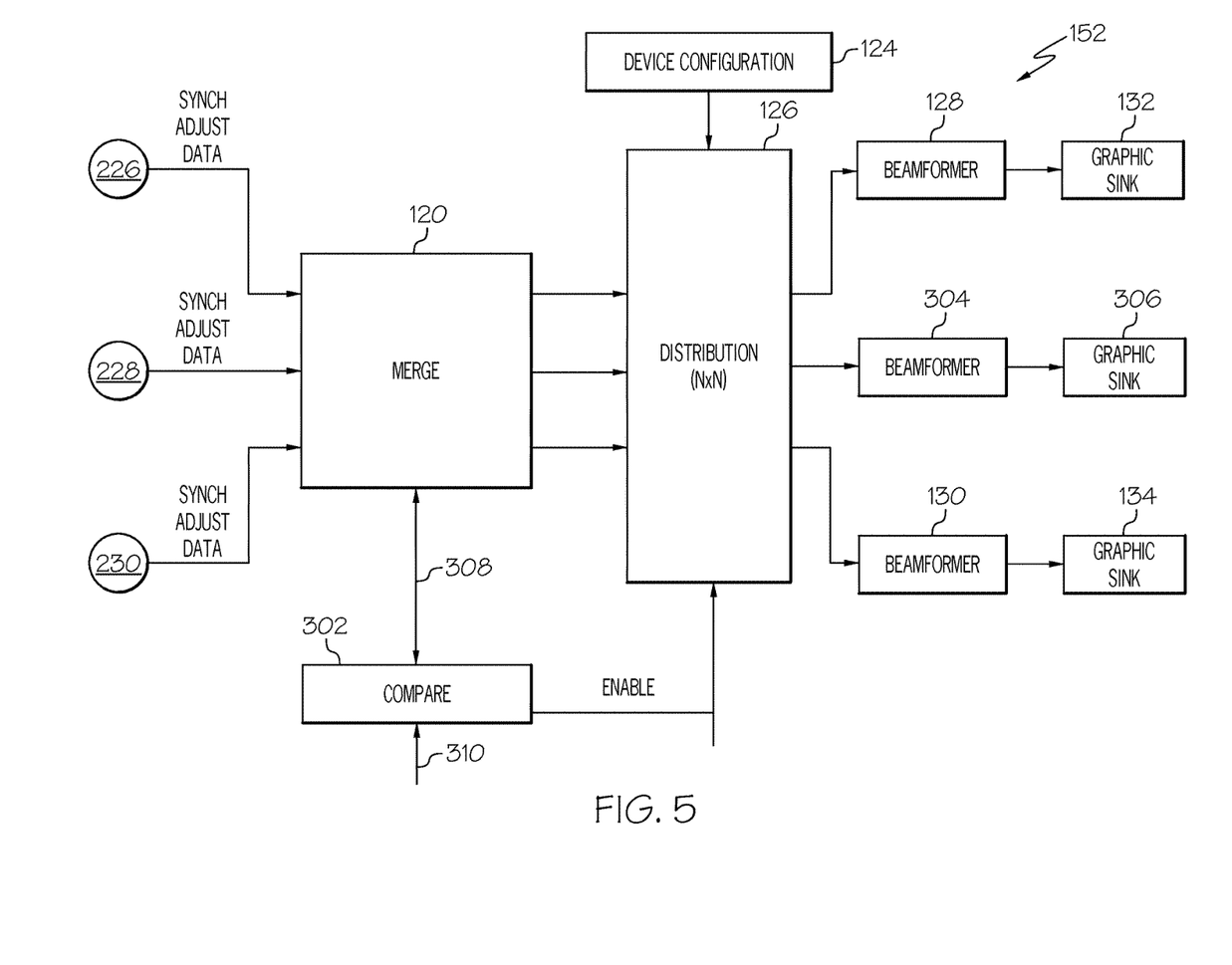
FIG. 5 is an expanded block diagram of a second portion of FIG. 1, providing additional detail, in accordance with the exemplary embodiment.

Each of the N graphics engines (114 to 116) performs a cyclic redundancy check (CRC), at a graphic data CRC module (402, 404, and 406, FIG. 5). The graphic engine performs a CRC by processes the incoming PGD with inserted specialized, non-intrusive, data-independent patterns, and generates a CRC valid signal, and a timestamp/sync signal. The CRC valid signal and timestamp/sync signal are received by a source validity module (214, 216, and 218), and used for time synchronizing the PGD. Generation of a CRC valid signal and the timestamp/sync signal is described in more detail in connection with FIG. 4.

At each of the N source validity modules (214, 216, and 218), a "data check" is done to verify that there is no data corruption in the graphics engine by comparing i) the associated input PGD to ii) PGD processed by the graphics engine to determine whether there has been data corruption and generating an input data validity indication corresponding to that determination when data corruption has been determined. This "data check" assures the validity of the data. The output from a source validity module (for example, 214) is a subsequent "input data validity indication" for a respective synch adjust module.

The output of each of the plurality of source validity modules (214, 216, and 218) is coupled to a respective one of a plurality of synch adjust modules (220, 222, and 224), as is an associated rasterized PGD output from a first graphics engine, and rasterized PGD output from a second graphics engine. For example, synch adjust module 222 receives, as input: rasterized PGD 232 from graphics engine 114; rasterized PGD 234 from graphics engine 204; and input 236 from source validity module 216. The synch adjust module 222 determines, based in part on the available inputs, whether to use a flexible, deterministic fault-adjusted data response based upon the graphic data configuration module 112 or a respective output from a rasterization module (414, FIG. 4). The functionality of the synch adjust modules (220, 222, and 224) are described in more detail in connection with FIG. 4. Outputs from each of the plurality of synch adjust modules (220, 222, and 224) pass to the next stage (a merge module, such as merge module 120), depicted in FIG. 3. The output from a synch adjust module such as synch adjust 222, is a time-synchronized, deterministic PGD (for example, synch adjust data 228).

FIG. 4 is a further expanded block diagram of subsection 250 of FIG. 3, providing more detail of the graphics engines (114, 204 and 116), in accordance with the exemplary embodiment. As an overview, each graphic engine of the plurality of graphics engines (for example, graphics engine 114 from FIG. 1 and FIG. 2) comprises a graphic data (CRC) module, a geometry engine, and a rasterization module. The graphics engine validates an associated parallel graphical data set, and generates a rasterized PGD set. Using a specific example, graphics engine 114 comprises graphic data CRC module 402, geometry engine 408, and rasterization module 414. The functionality of these modules is described below.

Generally, each graphic data (CRC) module receives input PGD and generates a data comparison signal called the CRC valid signal, a timestamp/sync, and a resulting associated validated parallel graphical data set. Each graphic data (CRC) module comprises logic and memory sufficient to perform validity checking and data verification, as well as time-synchronization. Validity checking is performed by inserting specialized data-independent patterns into the parallel graphic data stream in a novel, non-intrusive way. The specialized data-independent patterns may be static configured patterns, stored in the memory within the graphic data (CRC) module, or may be dynamically configured patterns. The output from a graphic data (CRC) module is the input into a respective geometry engine. In the exemplary embodiment, graphic data CRC module 402 receives PGD input via stage two switch 208 and generates the CRC valid signal 430 and the timestamp/sync signal 432. Validated PGD 434 from a graphic data CRC module 402 is the input received by a geometry engine 408.

Output of a geometry engine (such as geometry engine 408) is input into a rasterization module (such as rasterization module 414), which generates rasterized parallel graphical data (such as rasterized parallel graphical data 438). The rasterized parallel graphical data 438 is synchronized by synch adjust 220, which creates synch-adjusted, deterministic, parallel graphical data by time-synchronizing the rasterized parallel graphical data 438 with its respective one of the N input parallel graphical data sets.

Next, at the source validity module (for example, source validity module 214, 216, and 218), a "data check" is done, said data check inputs a data comparison signal (CRC valid signal) and a timestamp/sync signal in order to generate a high-integrity and deterministic "input data validity indication" signal for reception by a respective synch adjust module of the plurality of synch adjust modules (for example, 220, 222, and 224). Each synch adjust module also receives input from a respective graphic data configuration module 112 and from an associated rasterization module of the plurality of rasterization modules (for example, rasterization module 414, 416, and 418) within the respective graphics engine. Moving to a specific example, in the embodiment, source validity module 214 receives CRC valid signal 430 and the timestamp/sync signal 432 and generates high-integrity and deterministic indication signal output 440. Synch adjust module 220 receives the following input: a flexible, deterministic fault-adjusted data response 442 (received from the graphic data configuration module 112), rasterized parallel graphical data 438 (from rasterization module 414), and input data validity indication signal 440.

FIG. 5 is an expanded block diagram of second region 152 of FIG. 2, providing additional detail, in accordance with the exemplary embodiment. Second region 152 is a view within one of M cores, and the below described functionality is provided by each of the M cores. Merge module 120 receives synch-adjusted parallel graphical data sets from each of N graphics engines (for example, synch adjust data 226, 228, and 230). In addition, merge module 120 receives compare signals from compare module 302. Traditional GPUs typically employ point-to-point processing. The novel merge module 120 in the exemplary embodiment enables point-to-multi-point multiplexing of flexible groupings of PGD from each of the M cores to formulate a coherent, high-integrity, radiation tolerant PGD graphic data "display" that is based upon the dynamic, flexible groupings of parallel graphical data inputs. By allowing the final selection of merged PGD through the N×N matrix via redundant parallel paths, radiation-mitigated, high integrity, time-synchronized PGD "display data" is presented to the graphical sinks (for example 132, 306, and 134) and radiation tolerance is achieved. This point-to-multipoint multiplexing is described in more detail as follows.

Output from a respective merge module 120 ("merged PGD") may become input to an associated compare module 302. As previously described, compare module 302 performs an "integrity compare," in which it compares the merged PGD 308 from a merge module 120 in a first GPU core 102 to merged PGD 310 from a merge module 120 in a second GPU core 104 (wherein the first GPU core 102 and second GPU core 104 are two of M total cores) to determine whether the two groupings or sets of data compare, and either generates/asserts an enable signal or turns the enable "off" In an embodiment of the instant GPU, the compare module 302 may receive PGD from each merge module 120 of the plurality of merge modules 120, found within each of the M cores.

N×N distribution module 126 receives merged, synch-adjusted parallel graphical data (PGD) sets associated with each of the graphics engines, thereby creating N×N merged PGD; and then deterministically distributes, according to a plurality of enable signals defining a first distribution, the merged PGD to a plurality of graphic sinks. As mentioned, the merged PGD distributed by the N×N matrix, via redundant parallel paths, comprises radiation-mitigated, high integrity, time-synchronized PGD "display data" that is presented to the graphical sinks (for example 132, 306, and 134). In practice, this means that output from the N×N distribution module 126 drives, according to the first distribution, one or more respective beamformers (for example, beamformer 128, 304, and 130), and the beamformers generally transmit focused signals to one or more target devices. In the embodiment, the target devices are one or more respective graphic sinks (for example 132, 306, and 134).

Device configuration module 124 contains data, logic, and/or memory, and receives enable signals. Based on the enable signals, device configuration module 124 deterministically and real-time generates control signals sufficient to reconfigure the N×N distribution module 126 defining a first distribution. Accordingly, device configuration module 124 provides the ability to deterministically and real-time define a second, third, and nth distribution, wherein each distribution is with respect to graphic sinks that are coupled to the N×N distribution module 126. With this feature, device configuration module 124 provides a novel approach for the multiplexing of high-integrity data to N graphical sinks (for example, 132, 306, and 134) as a fault response to the failure of graphical sinks.

The above described systems and methods are repeated for each of M cores in the exemplary embodiment of GPU 100.

Thus, a novel method and system for a radiation tolerant GPU is provided. The provided radiation tolerant GPU supports open interfaces and provides sufficient graphics performance for known display formats as well as as-yet-undefined, futuristic, display formats that may be updated on-mission. The provided method and system do not rely on time budgets or time partitioning, and do not require command or control via an external master or central processing unit. The provided GPU approach further provides flexibility, high-integrity, and dynamic scalability.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for implementing a graphics processing unit (GPU), comprising:
   at a first GPU core:
   receiving N input parallel graphic data sets (PGD), each of the N PGD being from a respective one of N graphic sources, where N is a first number;
   dynamically creating a first configuration in which each of the N input PGD is coupled to a respective one of N graphics engines;
   dynamically (i) enabling P graphics engines, where P is a second number that is less than or equal to N, and (ii) disabling a remaining N-P graphics engines, wherein enabling turns a graphics engine on, and disabling turns a graphics engine off;
   at each of the P enabled graphics engines, processing PGD by
   (i) determining whether there is data corruption between input PGD to the graphics engine and output PGD from the graphics engine; and
   (ii) only when there is no data corruption between input PGD to the graphics engine and output PGD from the graphics engine, (a) generating a validated PGD;
   (b) rasterizing the validated PGD, thereby creating a rasterized PGD, and (c) time-synchronizing the rasterized PGD according to the first configuration, thereby creating a synch-adjusted PGD;
   merging the synch-adjusted PGD from each of the P graphics engines, thereby creating merged PGD; and
   distributing, according to a first distribution, the merged PGD to a plurality of graphic sinks;
   wherein, at each of the P enabled graphics engines, determining whether there is data corruption between input PGD to the graphics engine and output PGD from the graphics engine comprises:
   performing a Cyclic Redundancy Check (CRC) on the input PGD based on inserted specialized, non-intrusive, data-independent patterns to determine whether the CRC is valid; and
   generating a CRC valid signal and a timestamp signal, when the CRC is determined to be valid; and
   wherein time-synchronizing the rasterized PGD comprises processing the CRC valid signal and the timestamp signal.

2. The method of claim 1, further comprising, at a device configuration module, processing enable signals to generate control signals defining a first distribution, and
   wherein the step of merging comprises, at a merge module, receiving synch-adjusted parallel graphical data sets from each of N graphics engines, and the step of distributing comprises deterministically distributing, according to the first distribution, the merged PGD to the plurality of graphic sinks.

3. The method of claim 2, wherein the first GPU core is one of M GPU cores, and further comprising:
   comparing merged PGD from one of the M GPU cores to merged PGD from another of the M cores to determine whether they are equal, which defines a data compare; and
   generating an enable signal when there is a data compare, and generating a disable signal when there is not a compare.

4. The method of claim 3, wherein each of the M GPU cores comprises at least one quality from the set including: radiation tolerant, space-rated, and high integrity.

5. The method of claim 1, further comprising:
   dynamically creating a second configuration in which each of the N input PGD is coupled to one of the N graphics engines, wherein the second configuration is different than the first configuration.

6. The method of claim 1, further comprising:
   deterministically distributing, in real-time, the merged PGD to the plurality of graphic sinks, according to a second distribution, wherein the second distribution is different than the first distribution.

7. A graphics processing unit (GPU), comprising:
   a first GPU core, comprising:
   N graphic engines, where N is a number;
   a source configuration module coupled to N sources of parallel graphic data (PGD), the source configuration module for controlling a configuration defining the input PGD to each graphic engine of the N graphic engines;
   the first GPU core to enable P graphics engines, where P is a second number that is less than or equal to N, and disable a remaining N-P graphics engines, wherein enabling turns a graphics engine on, and disabling turns a graphics engine off, wherein each of the P graphics engine is configured to,
   (i) receive input PGD from a respective one of the N sources of PGD in accordance with the source configuration module,
   (ii) determine whether there is data corruption between input PGD to the graphics engine and output PGD from the graphics engine, by performing a Cyclic Redundancy Check (CRC) on the input PGD based on inserted specialized, non-intrusive, data-independent patterns to determine whether the CRC is valid, and generating a CRC valid signal and a timestamp signal, when the CRC is determined to be valid; and
   only when there is no data corruption between input PGD to the graphics engine and output PGD from the graphics engine,
   (a) generate a validated PGD,
   (b) rasterize the validated PGD, thereby creating a rasterized PGD, and
   (c) time-synchronize the rasterized PGD according to the configuration by processing the CRC valid signal and the timestamp signal, thereby creating a synch-adjusted PGD;
   a merge module coupled to each of the N graphics engines and configured to (i) receive synch-adjusted PGD, one from each of the P graphic engines, and (ii) merge the P synch-adjusted PGD, generating merged PGD from the first GPU core; and a distribution module coupled to the merge module and configured to distribute the merged PGD to a plurality of graphic sinks in accordance with a first distribution determined based on enable signals.

8. The GPU of claim 7, further comprising a graphic data configuration module coupled to the N graphics engines and configured to selectively enable or disable each of the N graphics engines such that the P graphics engines are enabled, defined as turned on, and N-P graphics engines are disabled, defined as turned off.

9. The GPU of claim 8, wherein the GPU core is further configured to compare the merged PGD from the first core to merged PGD from a second core and (ii) determine whether they are equal, defined as a data compare.

10. The GPU of claim 9, wherein the GPU core is further configured to generate an enable signal when there is a data compare.

11. The GPU of claim 10, wherein the first GPU core and the second GPU core are each one of M total cores, and wherein the first GPU core is further configured to compare the merged PGD from the first core to merged PGD from each of the M cores.

* * * * *